United States Patent [19]

Knirsch et al.

[11] Patent Number: 4,651,198
[45] Date of Patent: Mar. 17, 1987

[54] COLOR IMAGE REPRODUCING APPARATUS WITH SHEET FEEDING DEVICE FOR RECIRCULATING A SHEET ON WHICH DOTS OF DIFFERENT COLORS ARE SEQUENTIALLY RECORDED

[75] Inventors: Franco Knirsch, Banchette; Giuseppe Coli, Pavone Canavese, both of Italy

[73] Assignee: Ing. C. Olivetti & C., S.p.A., Ivrea, Italy

[21] Appl. No.: 577,341

[22] Filed: Feb. 6, 1984

[30] Foreign Application Priority Data

Feb. 10, 1983 [IT] Italy .............................. 67146/83[U]

[51] Int. Cl.⁴ .......................... H04N 1/46; H04N 1/10
[52] U.S. Cl. ....................................... 358/75; 358/293
[58] Field of Search ..................... 358/75, 78, 80, 293, 358/294, 296; 355/3 SH (U.S. only), 4 (U.S. only), 14 SH (U.S. only)

[56] References Cited

U.S. PATENT DOCUMENTS

| | | | |
|---|---|---|---|
| 3,972,608 | 8/1976 | Moriyama et al. | 355/4 |
| 4,101,216 | 7/1978 | Grossmann | 355/35 |
| 4,161,749 | 7/1979 | Erlichman | 358/75 |
| 4,285,009 | 8/1981 | Klopsch | 358/80 |
| 4,412,225 | 10/1983 | Yoshida et al. | 358/75 |
| 4,476,486 | 10/1984 | Ayata et al. | 358/78 |
| 4,476,496 | 10/1984 | Thaler | 358/293 |
| 4,487,407 | 12/1984 | Baldwin | 355/14 SH |
| 4,490,740 | 12/1984 | Moriguchi | 358/75 |
| 4,510,523 | 4/1985 | Kurata et al. | 358/75 |
| 4,517,591 | 5/1985 | Nagashima et al. | 358/78 |

FOREIGN PATENT DOCUMENTS

| | | | |
|---|---|---|---|
| 129476 | 10/1981 | Japan | 358/294 |
| 196657 | 12/1982 | Japan | 358/294 |
| 182955 | 10/1983 | Japan | 358/75 |
| 1540525 | 2/1979 | United Kingdom | . |
| 2007377 | 5/1979 | United Kingdom | . |

Primary Examiner—James J. Groody
Assistant Examiner—Randall S. Svihla
Attorney, Agent, or Firm—Banner, Birch, McKie & Beckett

[57] ABSTRACT

A trichromatic photosensor scans an image to be reproduced repeatedly to generate, for each elementary area scanned, signals indicative of the chromatic characteristics of this elementary area. The photosensor is connected to a trichromatic printer controlled by the signals produced by the photosensor for printing corresponding colored dots on the paper. During successive scanning operations, the photosensor is moved relative to the color image and the printer is moved relative to the paper. These relative movements are coordinated with each other so that the photosensor and the printer act simultaneously on corresponding regions of the color image and of the paper. In one embodiment the printer is stationary and is capable of printing in parallel the dots of one line. The paper circulates along a closed path to be sequentially printed according to the various color components. In another embodiment the printer is of the serial type. The printing carriage mounts also the photosensor and moves transversely the printer and the photosensor to repeatedly scan the printing line.

18 Claims, 10 Drawing Figures

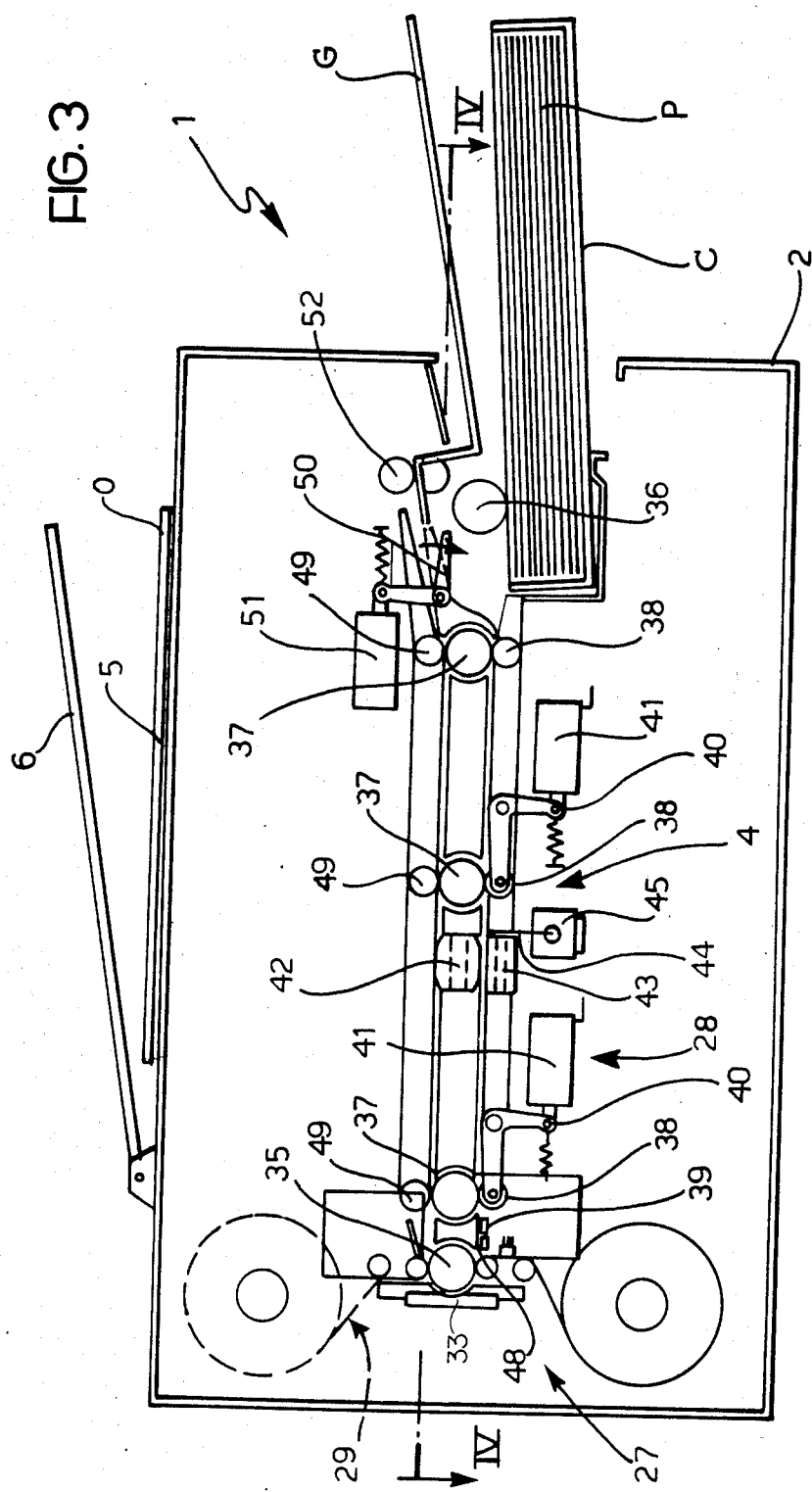

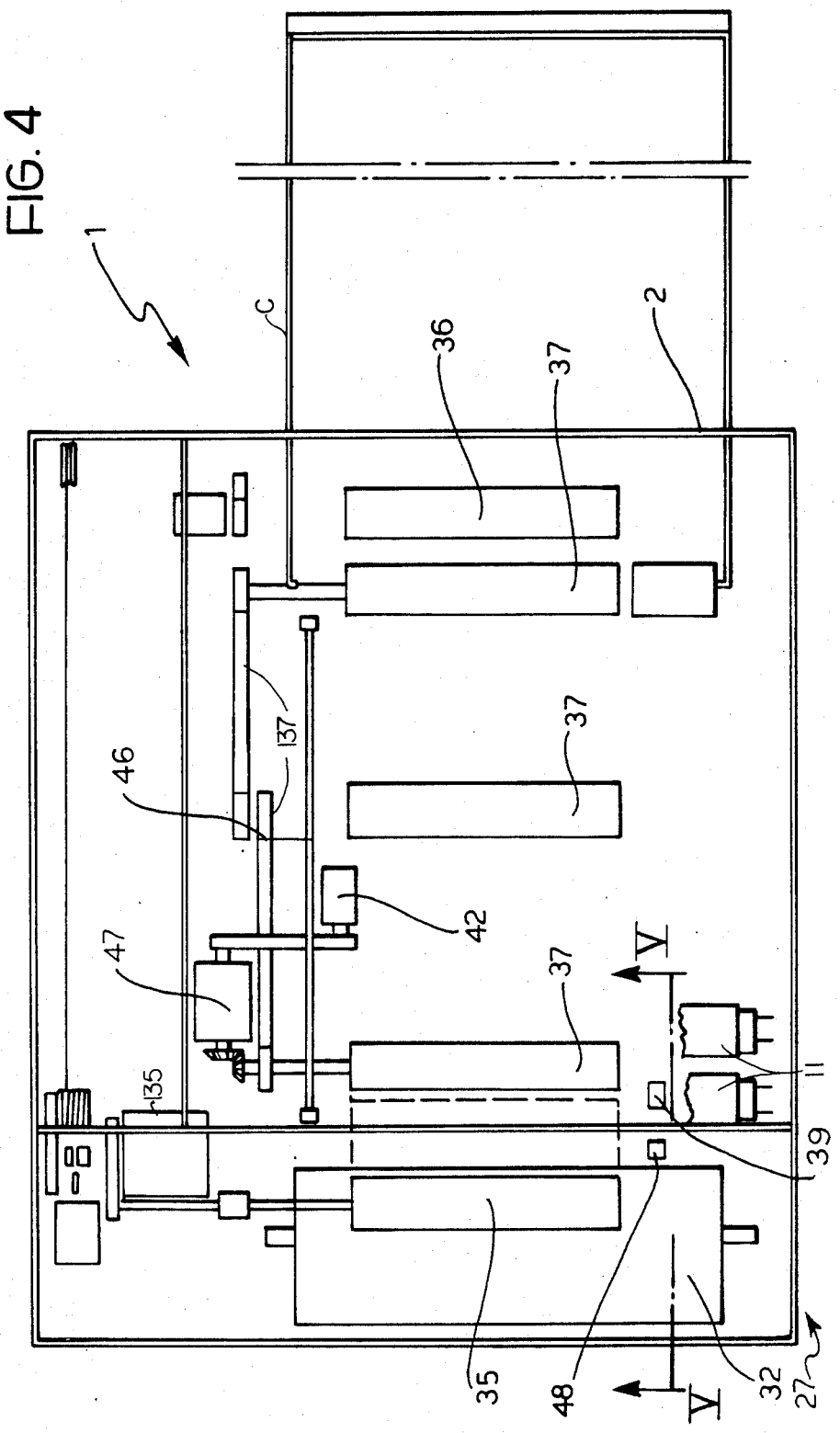

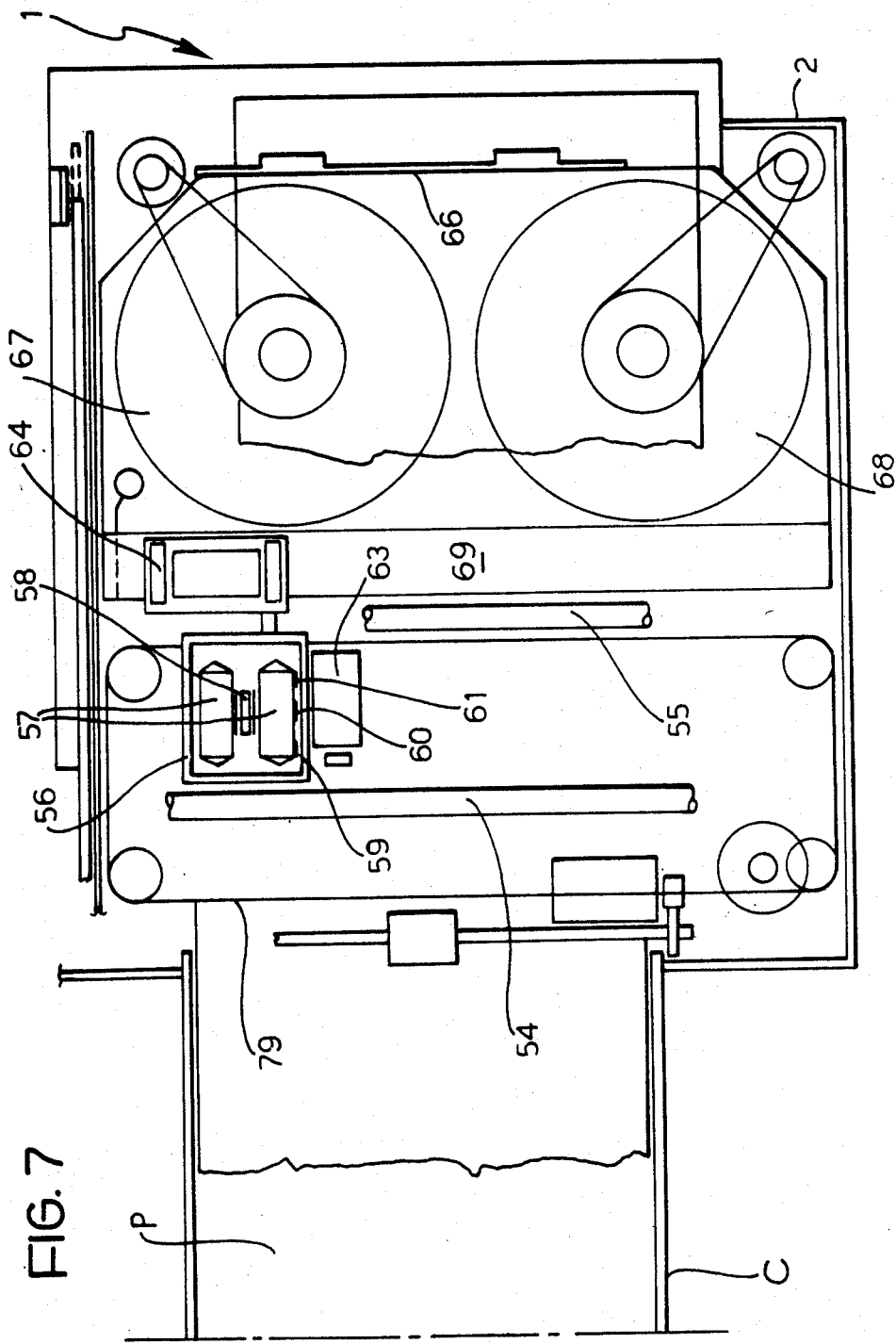

COLOR IMAGE REPRODUCING APPARATUS WITH SHEET FEEDING DEVICE FOR RECIRCULATING A SHEET ON WHICH DOTS OF DIFFERENT COLORS ARE SEQUENTIALLY RECORDED

BACKGROUND OF THE INVENTION

The present invention relates to methods of reproducing coloured images and, in particular, to a method of reproducing a coloured image on a printable substrate.

More particularly the invention relates to an apparatus for reproducing a coloured image by scanning repeatedly the image by means of polychromatic photosensor means to generate signals indicative of polychromatic components of the elementary area, a dot printing device being controlled by said signals for printing corresponding coloured dots on a sheet.

Since these apparatuses require that the scan operation be repeated for each elementary chromatic component of the image, it is essential that the sheet be repeatedly brought in front of the printing device and be exactly repositioned at the beginning of each scanning operation.

There are known several kinds of image reproducing apparatuses of the above type. In one kind of apparatus both the photosensor means and the printing device are adapted to instantaneously scan one elementary line of the image and the sheet.

In a known apparatus of this kind the printable support is represented by a continuous web which is repeatedly reciprocated with respect to the printing device, whereby the web moving device is rather intricate and unreliable in operation.

Another kind of reproducing apparatus includes a transversely movable printing device for printing repeatedly a portion of the sheet. In a known apparatus of this kind, separate printing elements are provided for each colour, whereby the problem of exactly mutually positioning the sheet and the printing elements for the various colours is also faced.

SUMMARY OF THE INVENTION

The primary object of the invention is to provide an apparatus for reproducing coloured images of the above type, wherein the same printing elements are provided for printing dots of different colours in different scan operations and wherein the printable sheet and the printing device are relatively exactly repositioned at the beginning of each scan operation.

According to a first embodiment of the invention, where one elementary line at a time is reproduced, we now provide a sheet feeding device including a printing roller cooperating with said printing device for sandwiching said sheet and rotatable for moving said sheet with respect to said printing device during the scanning operations, a plurality of simultaneously rotating advancing rollers each one having its axis parallel to the axis of said printing roller and located in a common plane, a plurality of pairs of pressure rollers associated with said plurality of advancing rollers, the pressure roller of each pair engaging the associated advancing roller at a pair of locations diametrically opposed and symmetric with respect to said common plane, whereby said sheet is advanced in sequence in two opposite directions, and control means for causing said sheet to be cyclically moved said predetermined number of times along a closed loop path defined by said pressure rollers, said printing device and said control means.

According to another embodiment of the invention wherein the sensor and the printing device are transversely moved by a common carriage, we now provide a group of thermal dot printing elements controlled by the signals of the associated photosensor elements for instantaneously printing dots, each one on a fraction only of an elementary line of a sheet, and an ink ribbon located between said printing elements and said sheet and having thermotransferable coloured materials, said ribbon carrying an ordered distribution of coloured frames having coloured materials corresponding to said chromatic components, and means for advancing said ribbon parallel to the movement of said carriage between two successive scan operations to change over between two differently-coloured frames.

The invention enables the reproduction of coloured images using intrinsically reliable modules whereby to ensure substantial consistency in results over a period of time without regulating adjustments, with smaller dimensions, weight and costs than solutions at present used in the art of xerography. More particularly, the invention allows digital electronic copiers to be made for which it is relatively simple to provide additional different functions such as printing, remote transmission of images and the like.

BRIEF DESCRIPTION OF THE DRAWINGS

The invention will now be described, purely by way of non-limiting example, with reference to the appended drawings, in which:

FIG. 3 is a further sectional view illustrating commom elements of the apparatus of FIG. 1 and FIG. 2 in greater detail, FIG. 4 is a schematic plan view substantially corresponding to FIG. 3, FIG. 7 is a schematic view approximately corresponding to line VII—VII of FIG. 6.

DETAILED DESCRIPTION OF THE PREFERRED EMBODIMENTS

Figure 1:
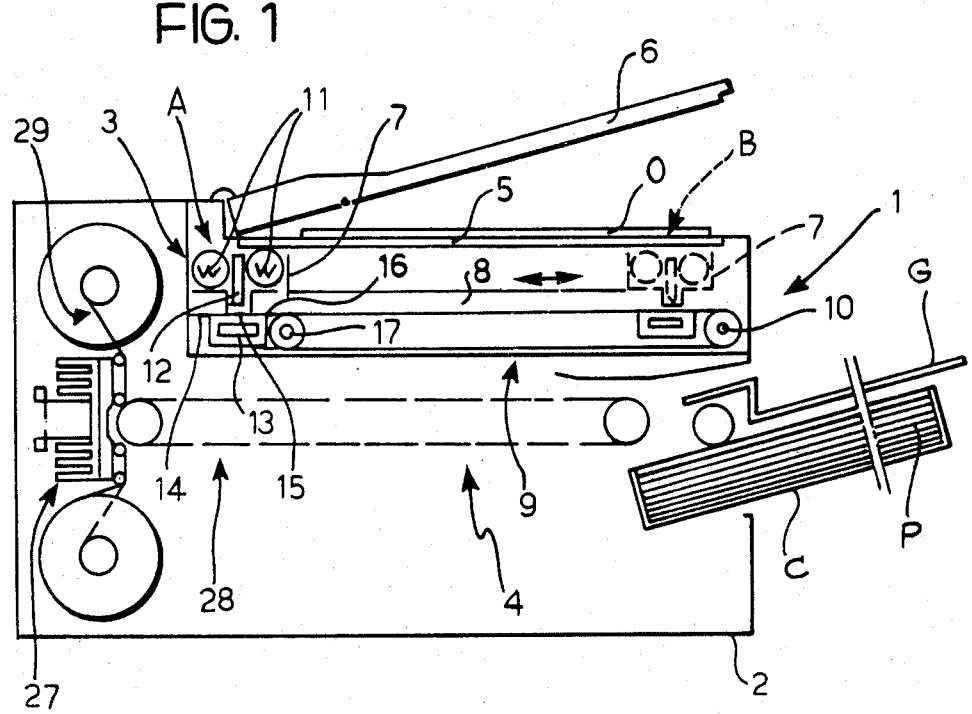
FIG. 1 is a vertical median section illustrating schematically the internal structure of apparatus embodying the invention.

The description which follows illustrates the application of the invention to a paper copying machine using an electric thermal printing device.

However, in the claims below, the term "printable substrate" is intended to identify any paper, celluloid, plastics or like substrate to which a visually-perceptible graphical indication may be transferred by corresponding "printing means". Similarly, the term "image" indicates generically the original to be reproduced, regardless of the form in which this original is present (print on paper, plastics material, celluloid etc.).

Shown in the drawings is a copying machine, generally indicated 1, which is intended to allow the reproduction in colour of an image (original) O carried on a sheet of paper or the like. The reproduction is produced on printable substrates constituted by sheets of paper P contained in a cassette C that is attached, usually in a removable manner, to the structural housing of the machine 1, this housing being generally indicated 2.

In all the copying machines illustrated in the drawings, it is possible to distinguish a first portion generally indicated 3, in which the detection of the characteristics of the original image O is effected, and a second portion, generally indicated 4, in which the image O is reproduced on one of the sheets P using the information on the characteristics derived in the first portion 3.

Figure 2:
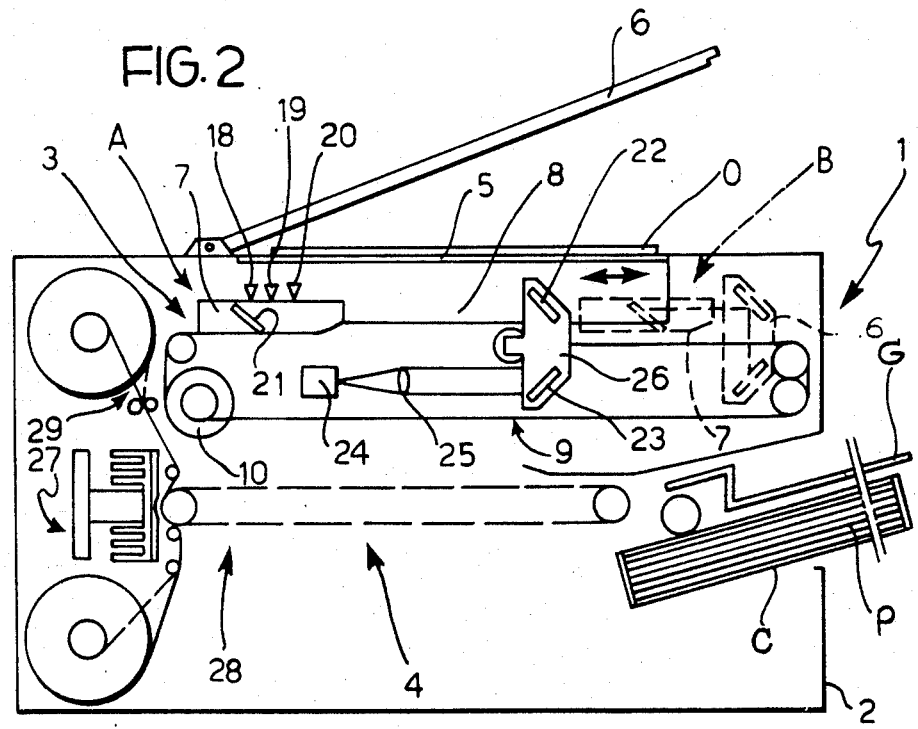
FIG. 2 is a view substantially identical to FIG. 1 illustrating a first variant of the apparatus embodying the invention.

With reference to the embodiments illustrated in FIGS. 1 to 3, a transparent glass plate 5 is illustrated on which the original O is located and held firm by means of an ordinary pivotably raisable blanket 6.

In FIG. 1 reference 7 indicates a carriage which is movable on guides 8 carried by the housing 2 of the machine 1 in positions facing the glass 5 on which the original O is located.

The carriage 7 is driven by means of a belt transmission generally indicated 9 controlled by a drive pulley 10 rotated by a motor (not visible) preferably of the d.c. or stepping type.

A scanning movement longitudinally of the transparent glass 5 may thus be imparted to the carriage 7. As a result of this movement, the carriage 7 is brought from an initial starting position, represented in full outline and indicated A in FIG. 1, to an end of stroke position indicated in broken outline by B in the same Figure.

Return of the carriage 7 from the end of stroke position B to its starting position A is effected by reversing the sense of rotation of the motor driving the pulley 10, the motor preferably being made to operate at a higher speed than that used during scanning of the original O from position A towards position B.

Two lamps 11 are mounted on the carriage 7 for illuminating the original O during the scanning movement.

The lamps 11 emit light with a spectrum which extends over the entire visible range.

Reference 12 indicates an objective preferably constituted by an array of optical fibres, that is intended to effect the scanning of the original O illuminated by the lamps 11. The radiation reflected from the elementary area of the original O framed by the objective 12 is projected on to a photo-detector 13 after it has passed through one of three chromatic filters 14, 15 and 16 so as to detect the yellow component, the magenta component and the cyan component of the reflected radiation respectively.

The filters 14, 15 and 16 can be interposed selectively in the path of the radiation from the objective 12 to the photo-detector 13 by the operation of a small d.c. or stepping motor 17 mounted on the carriage 7.

The colours of the chromatic filters 14, 15 and 16 correspond to the primary colours of a colour triangle. When one of these filters is located across the output of the objective 12, the intensity of the radiation incident on the photo-detector 13 is indicative of the chromatic components of the reflected radiation complementary to that of the filter.

Thus, the intensity of the radiation incident on the photo-detector 13 when the filter 14 (blue) is interposed between the objective 12 and the photo-detector 13 is indicative of the yellow content of the elementary area being scanned at that instant.

When the motor 17 brings the filter 15 (green) into alignment with the objective 12, the intensity of the radiation incident on the photo-detector 13 is indicative of the magenta content of the elementary area of the original O being scanned at that instant while the cyan content of that elementary area is determined by aligning the filter 17 (red) with the objective 12.

The photo-detector 13 is normally constituted by a semi-conductor photo-detector such as, for example, an amorphous silicon sensor. One of the alternatives possible for the photo-detector 13, is to use an optical CCD sensor (Charge Coupled Device). It is thus possible to use a photo-detector comprising a linear array of photosensitive elements arranged to examine simultaneously elementary areas defining an elementary line of the original O.

Another configuration which permits an analysis of the chromatic characteristics of the original O is illustrated in FIG. 2 in which three light sources 18, 19 and 20 are mounted on the carriage 7 movable on the guides 8, each light source having a narrow band emission spectrum concentrated around a wavelength corresponding to one of the primary colours. For example, the source 18 may be constituted by an array of light emitting diodes (LED) having an emission spectrum concentrated about the wavelength corresponding to blue while the source 19 is constituted by an array of light emitting diodes with an emission spectrum concentrated about the wavelength corresponding to green, and the source 20 is constituted by an array of light emitting diodes having an emission spectrum concentrated about the wavelength corresponding to red.

By 21, 22 and 23 are shown three mirrors for capturing the radiation reflected from the surface of the original O when the original itself is illuminated, for example as shown in FIG. 2, with one of the light sources 18, 19 and 20, and for directing this reflected radiation to a photo-detector 24 which is fixed to the housing 2 of the copying machine and is provided with a focussing objective 25.

The reflecting mirror 21 is mounted on the carriage 7 at an inclination of about 45° to the plane of the transparent glass 5. the radiation reflected from the original O is thus directed parallel to the plane of the glass 5 from the mirror 21 towards the mirror 22 which in its turn reflects the radiation perpendicular to the glass 5 and away from the glass itself. The radiation transmitted by the mirror 22 is finally reflected by the mirror 23 which reconfers on the radiation a direction of propogation parallel to the glass 5 so that the path of propogation of the radiation between the mirror 21 and the photo-detector 24 is approximately U-shaped.

The mirrors 22 and 23 are mounted on further carriage 26 movable on the guides 8. The carriage 26 is driven by an auxiliary section of the belt transmission 9 at a speed equal to half the translational speed of the carriage 7 carrying the mirror 21. Thus the length of the optical path between the original O and the photo-detector 24 is maintained constant.

The system constituted by the carriage 7 carrying the sources 18, 19, 20 and the mirror 21 and the carriage 26 carrying the mirrors 22 and 23 is thus able to effect, together with the photodetector 24, a scanning of the original O substantially similar to that achieved by using the configuration of photosensor means described with reference to FIG. 1.

Again in this case, the starting position of the scanning movement is illustrated in full outline and indicated A while the end of stroke position is illustrated in broken outline and indicated B.

The movement of the belt transmission 9 which drives the carriages 7 and 26 is controlled by a d.c. or stepping motor (not shown) having different rotational speeds in its two senses of rotation whereby to effect gradual scanning of the original O during movement from position A towards position B and a rapid return movement.

In a substantially similar manner to the trichromatic analysis technique described with reference to the embodiment of FIG. 1, the illumination of the original O by the light source 18 (blue) allows the photo-detector 24 to output a signal indicative of the yellow content of the original. However, illumination of the original O with the source 19 (green) or with the source 20 (red) makes it possible to obtain, at the output of the photo-detector 24, signals indicative of the magenta content and the cyan content of the original respectively.

Again in this case, the scanning of the original O is carried out in lines, using linear arrays of light emitting diodes (LED) as the light sources 18, 19 and 20, each of the diodes having a longitudinal extent equal to the length of an elementary line of the original O. A CCD Photo-detector which can examine all the elementary areas defining one of the elementary lines of the original O can usefully be employed as the photo-detector 24.

From what has been described above, it is thus clear that the trichromatic analysis system using three restricted-spectrum sources 18, 19 and 20 may be used together with the scanning configuration illustrated in FIG. 1, just as the trichromatic analysis configuration using the lamps 11 and the filters 14, 15 and 16 may be used together with the scanning configuration illustrated in FIG. 2.

In the portion of the copying machine 1 arranged to reproduce the image onto the sheets P (this portion, which is indicated 4, has characteristics which are substantially identical in the machine of FIG. 1 and in the machine of FIG. 2), there can be distinguished a printing device and a device for feeding the sheets P, these devices being generally indicated 27 and 28 respectively. The feed device 28 is illustrated in detail in FIG. 3.

In the embodiment illustrated, the printing device 27 is constituted by a ribbon-using electric thermal printer.

Figure 5:
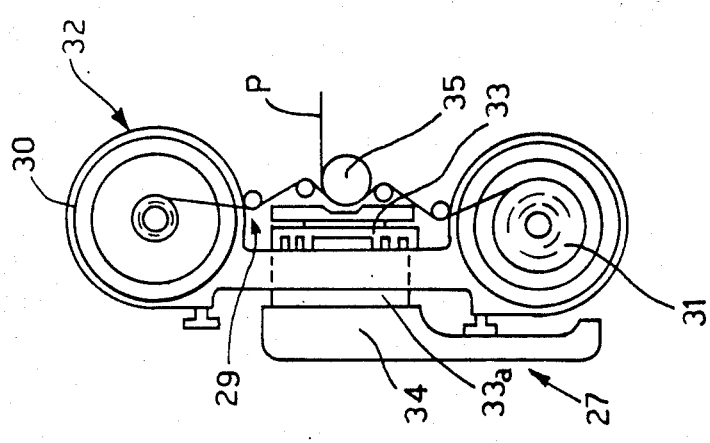
FIG. 5 is a side view of one of the elements illustrated in FIGS. 1 to 3 on an enlarged scale.

The printer 27 is supplied with a thermal print ribbon 29 which is wound, as illustrated in greater detail in FIG. 5, between a supply spool 30 and a take-up spool 31.

The spools 30 and 31 are mounted within a container (cassette or cartridge) 32 which ensures the correct positioning of the ribbon 29, facilitating its loading and replacement.

The ribbon 29, which is a thermal print ribbon, carries a deposited layer of heat meltable ink arranged in an ordered succession of frames of different colours.

The colours of these frames, each of which has an extent corresponding to the size of the substrate, is selected so as to render the reproduction of the original O on the sheets P possible by subtractive mixing.

With reference to the chromatic characteristics of the filters 14, 15, 16 and the sources 18, 19, 20 described above, this is achieved by means of an ordered arrangement of frames having yellow, magenta and cyan as the dominant colours.

Reference 33 indicates a printing head arranged to act on the ribbon 29 to transfer to the sheets P, dot configurations (digital patterns) the chromatic contents of which are defined on the basis of the information derived during scanning of the original O carried out in the manner described above with reference to FIGS. 1 and 2.

More particularly, printing of the yellow component of the reproduced image uses the information derived when the filter 14 (blue) is interposed between the objective 12 and the photo-detector 13, or the information derived when the original is illuminated with the photo-diode array 18 (blue).

Similarly, printing of the magenta component uses the information derived during scanning of the original O with the interposition of the filter 15 (green) between the objective 12 and the photo-detector 13, or the information derived when the original O is illuminated with the light emitting diode array 19 (green).

Finally, printing of the cyan component uses the information derived during scanning of the original O with the filter 16 (red) interposed between the objective 12 and the photo-detector 13, or the information derived during scanning of the original O when the latter is illuminated with the light emitting diode array 20 (red).

To reproduce each elementary area of the image it is thus necessary to effect three successive scannings—respectively carried out with the filter 14 or the light-emitting diode array 18 (blue), the filter 15 or the light-emitting diode array 19 (green) and the filter 16 of the light-emitting diode array 20 (red), and three successive printing operations, using adjacent frames of the ribbon 29 having respectively yellow, magenta and cyan colours.

During each printing operation, the number of coloured dots in each of the "digital patterns" is inversely proportional to the exposure undergone by the photo-detector 13 or the photo-detector 24 during the corresponding scanning phase.

In order to achieve a good colour rendering, it is necessary for the resolution to be adequate and for the printed pattern to be constituted by a sufficient number of elementary dots disposed, for example, in a 3×3 or 4×4 square matrix.

In known manner (for example, by arranging for the motor 17 to have an operating position in which none of the filters 14, 15 and 16 is interposed between the objective 12 and the photo-detector 13, or by arranging for the light emitting diode sources 18, 19 and 20 to operate simultaneously) it is possible to derive from the photo-detector 13 or the photo-detector 24 information relating solely to the brightness of the original and to use a ribbon 29 including black or grey colour frames. In this manner it is possible to make the copying machine operate in black and white whenever necessary.

A black and white printing operation can be carried out together with the three chromatic printing phases in order to enrich the trichromatic print, particularly with regard to its definition.

As is best seen in FIG. 5, the printing head 33 is mounted on a support 34 fixed to the housing 2 of the copying machine 1.

A roller 35 rotated by an electric motor 135 (FIG. 4) is arranged to feed the sheet P being used as the reproduction substrate and the ribbon 29 past the printing head 33 in such a disposition that the ribbon is sandwiched between the head 33 and the sheet P.

The transverse dimensions of the ribbon 29 and the corresponding longitudinal dimension of the printing head 33 can be selected so as to allow one printing phase to be carried out simultaneously on all the elementary areas defining an elementary line of the sheet P, that is, in correspondence with the configuration of the photo-detector 13 or the photo-detector 24. (Parallel reproduction system).

Alternatively, it is possible to use a printing head 33 arranged to act simultaneously on elementary areas defining a fraction of an elementary line of the sheet P used for the printing of the reproduced image.

In this case, the printing head 33 and its supports are mounted on a carriage movable transverse to the direction of scanning of the original O (Parallel-series reproduction system).

In each case the arrangement described makes it possible to effect, simultaneously or nearly simultaneously, both the detection of one of the chromatic characteristics of an elementary line of the original O and the printing of the corresponding chromatic component of a line of the image reproduced on one of the sheets P.

The trichromatic reproduction (possibly with the addition of a black and white component) of an elementary line of the original C is thus achieved by means of three (four in the case of the addition of black and white) successive operations of scanning the original and three (four in the case of the addition of black and white) operations of printing on one of the sheets P.

Thus for this purpose it is necessary to feed each of the sheets P to the printing device 27 three (or four) times consecutively while ensuring that the positions taken up by the sheet P are the same during successive printing phases so as to avoid blurring and similar phenomena of degradation of the image reproduced.

This result is achieved with the feed device for the sheets P illustrated in detail in FIGS. 3 and 4.

In these Figures reference 36 indicates a motor-driven roller (sheet take-up roller) which is intended to allow the sequential take up of the sheets P from the cassette C.

Under the action of the sheet take-up roller 36, each of the sheets is caused to slide beneath three drive rollers 37 against each of which a lower counter-roller 38 acts. The rollers 37 are simultaneously rotated by a pulley and belt transmission 137. The rollers 37, 38 advance each sheet until the margin of the sheet is brought into alignment with a photoelectric sensor (photocell) 39 located close to the roller 35.

Under these conditions, the sheet P is disengaged from the roller-counter roller pair 37, 38 furthest from the roller 35 and rests on the other two counter rollers 38, each of which is mounted at the end of one of the arms of an L-shaped bracket 40 that can be pivoted under the action of a corresponding relay 41.

The arrangement is such that once the front edge of the sheet P has been aligned with the photodetector 39, the brackets 40 are oriented so as to remove the corresponding counter rollers 38 from the overlying rollers 37.

Reference 42 (see also FIG. 4) indicates a roller the axis of rotation of which is coplanar with and perpendicular to the axis of rotation of the rollers 37.

As seen in FIG. 4, the roller 42 is mounted in a position substantially corresponding to one of the side margins of the sheet P introduced into the feed device 28.

Beneath the roller 42 is a counter roller 43 which is also supported by one of the arms of a pivoted bracket 44 that can be oriented by means of a relay 45.

The relay 45 controls the raising of the counter roller 43 against the roller 42 immediately after the counter rollers 38 mounted on the brackets 40 have been lowered to allow the sheet P to move freely over the rollers 38 themselves.

Under these conditions, the roller 42 and the counter roller 43 are clamped on the sheet P. Rotation of the roller 42 about its axis thus causes transverse movement of the sheet P and pushes the sheet itself against a side reference (register) 46 (FIG. 4) located in a predetermined fixed position which can be selectively set in dependence on the dimensions of the sheet P.

Normally the reference 46 is positioned by an electromagnet (not shown) operated before the clamping of the roller-counter roller pair 42, 43. The reference 46 is positioned along a path directed towards the interior of the feed device 28 so as to ensure correct alignment of the sheet P even when, during introduction into the feed device, the margin of the sheet P adjacent the roller-counter roller pair 42, 43 is displaced irregularly towards the exterior of the machine 1.

As is seen in FIG. 4, the roller 42 and the roller 37 adjacent the roller 35 are rotated by a single motor 47 through two selectively-engageable transmissions.

In a first embodiment, the arrangement is such that, once the sheet P has been aligned with the reference 46 by means of the roller 42, the motor 47 is coupled to the roller 37 and starts to advance the sheet towards the printing device 27.

Downstream of the photodetector 39, in the direction of movement of the sheet P towards the printing device, there is a further photodetector (photocell) 48.

Immediately after the front edge of the sheet P passes in front of the photodetector 48 the roller 35 is caused to rotate. The roller 35 draws the sheet P (and the ribbon 29) against the printing head 33 with an advancing motion which emulates the movement of the carriage 7 relative to the original O located on the transparent glass.

In the embodiment of FIG. 3 the selectively-engageable transmission is represented by the selectively-engageable rollers 38 and 42, which are operated by the electromagnets 41 and 45 controlled by the photodetectors 39 and 48.

In the embodiment illustrated in FIGS. 1 and 2, the photosensor elements mounted on the carriage 7 scan lines of the original O. In this case, the roller 35 feeds the sheet P to the printing head 33 with a gradual advancing motion in which each step corresponds to the presentation of an elementary line of the sheet P to the printing head 33. As indicated above, the printing head 33 is arranged to act simultaneously on the entire line (reproduction in parallel) or comprises a printing element which is movable parallel to the axis of the roller 35 so as to achieve printing operations sequentially on adjacent regions of one line (parallel-series reproduction).

The operating arrangment described is thus such that the photosensor elements mounted on the carriage 7 and the printing device 27 act simultaneously on corresponding regions of the original O and of the sheet P used as the reproduction substrate.

As a result of its gradual advance between the roller 35 and the printing head 33, the sheet P continues in its path of movement within the device 28, sliding over the rollers 37 against which the sheet itself is pressed by a further series of counter rollers indicated 49.

Adjacent the counter roller 49 overlying the roller 37 that occupies the position furthest from the printing device 27, there is a repositionable guide device 50 selectively displaceable by means of a relay 51 into two operating positions.

In its first operating position, this guide device 50 directs the sheet P beneath the rollers 37 again.

In its second operating position, the guide device 50 guides the sheet P which is located above the rollers 37 towards a pair of expulsion rollers 52 which transfer the sheet itself to a collecting cassette G located above the feed cassette C.

During trichromatic printing, the guide device is positioned so as to cause the same sheet P to be circulated around the feed device 28 for a number of times equal to the number of successive monochromatic printing operations necessary to obtain the final desired product.

As indicated above, this number is three whenever three successive printing operations are to be effected, corresponding to the transfer onto the sheet P of the yellow, magenta and cyan components of the original O or four whenever the three printing operations indicated above are to be followed by a further operation for enriching the image reproduced, by means of a black and white printing phase.

Naturally when it is wished to make the machine 1 function exclusively as a black and white copier, the relay 51 is operated so that the guide device 50 will cause the sheet P to be transferred to the collecting cassette G after a single passage of the sheet P past the printing device 27.

Both the operation of longitudinal alignment of the sheet P by means of the rollers 37 and the photocell 39 and the operation of transverse alignment effected by means of the roller 42 and the reference 46 are repeated each successive recirculation of a single sheet P around the device 28.

This ensures that the successive printing operations which result in the formation of the trichromatic image are effected in register with each other thereby avoiding misalignment on the printed sheet P of the superimposed patterns of different colours relating to a single cell of the original O.

The unidirectional circulation of the sheet P through the feed device 28 means that the head 33 and the ribbon 29 do not have to be moved away from the printing roller 35 and this further increases the precision of the print.

According to a preferrred embodiment, a single motor (not illustrated) is used for driving the printing roller 35 and the transmission 9 which drives the carriage 7.

In this manner, a high degree of synchronisation is ensured between the scanning movement of the original O and the movement of the sheet P relative to the printing head 33, a movement which corresponds to the scanning of the sheet P by the printing head 33.

Preferably, the printing head 33 is of the "full parallel" type, having on a substrate a line of dot printing thermal elements, formed for example by conductor layers deposited on the substrate by means of the thin film or the thick film technology known in the art. The printing head 33 can also include integrated circuits for driving the printing elements. This head 33 is mounted on the support 34 with the inter-position of a resilient element 33a which ensures that a certain uniformly-distributed pressure is exerted between the head 33 and the printing roller 35, which is normally made of rubber.

The support 34 can be oriented about an axis parallel the the axis of the printing roller 35 so as to allow the manual disengagement of the head 33 from the roller 35 to enable the replacement or renewal of the cartridge 32 containing the ribbon 29.

Figure 6:
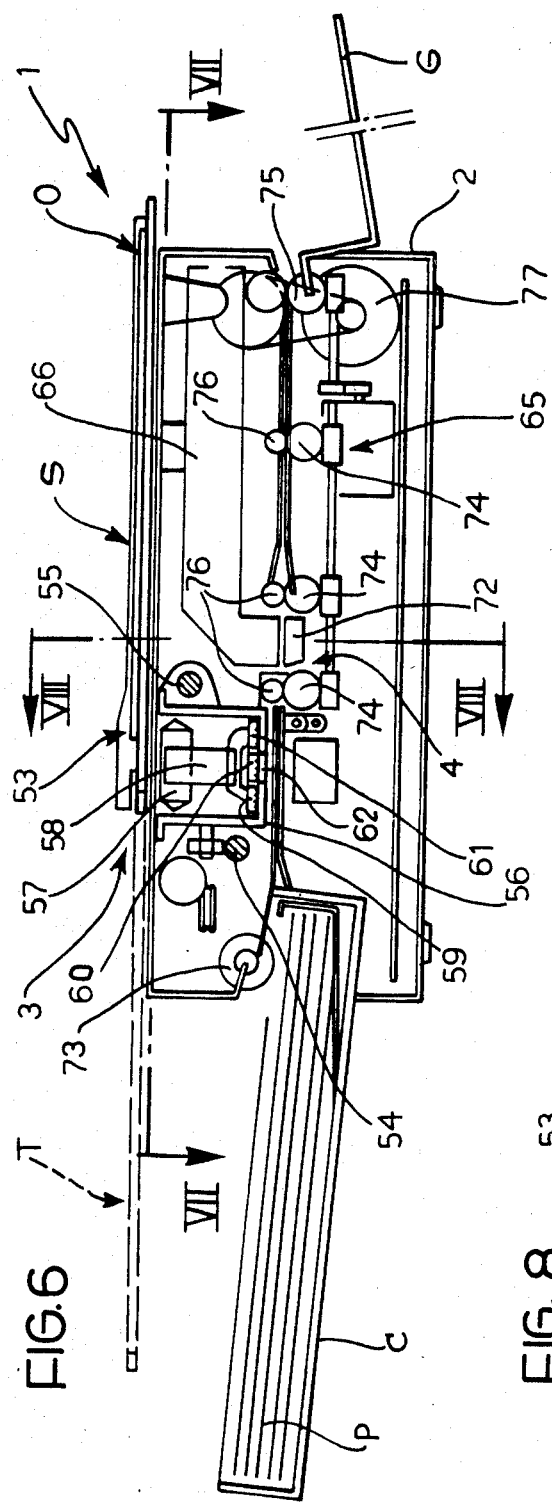
FIG. 6 is a vertical median section illustrating schematically the structure of another apparatus embodying the invention.

In the embodiment illustrated in FIG. 6, the housing 2 of the machine 1 has an upper pair of guides along which a carriage 53 is movable, the original O being laid carefully on the carriage and held firm by a raisable blanket substantially identical to that indicated 6 in FIGS. 1 and 2.

The carriage 53 is movable in a longitudinal direction relative to the housing 2 between two end positions one of which (starting position) is illustrated in full outline and indicated S in FIG. 6 and the other of which (end of stroke position) is illustrated in broken outline and indicated T in the same drawing.

The cassette C for feeding the sheets P and the cassette G for collecting the reproductions are aligned, on opposite sides of the housing 2 in the longitudinal direction of movement of the carriage 53.

Two parallel cylindrical guides 54 and 55 are located within the housing 2 and extend in directions perpendicular to the direction of sliding of the carriage 53.

A further carriage 56 is movable on the guides 54 and 55 and carries a system for examining the original O of the type described with reference to the embodiments illustrated in FIG. 1 or FIG. 2.

FIGS. 6 and 7 schematically show the arrangement on the carriage 56 of a pair of broad spectrum light sources 57, an objective 58 and a bank of three chromatic filters 59, 60 and 61 acting at wavelengths respectively corresponding approximately to blue, green and red. The filters 59, 60 and 61 can be interposed selectively between the objective 58 and a photodetector 62, for example an amorphous silicon photodetector, arranged to generate electrical signals indicative of the intensity of the radiation incident thereon. The displacement of the filters 59, 60 and 61 is effected by a motor 63 mounted on the carriage 56.

As described in detail with reference to the embodiment of FIG. 1, the lamps 57 are intended to illuminate the original O so as to generate reflected radiation which is captured by the objective 58. The objective 58 transmits this reflected radiation to the photodetector 62 through one of the filters 59, 60, 61 selected by operation of the motor 63.

Again in this case, the intensity of the radiation incident on the photodetector 62 when the blue filter 59 is associated with the objective 58 is indicative of the yellow content of the elementary area of the original O being scanned, at that moment, while the magenta and cyan chromatic components of the same elementary area are detected by associating the green filter 60 or red filter 61 respectively, with the objective 58.

The configuration described in FIG. 7 differs from that illustrated in FIGS. 1 and 2 in that the objective 58 and the elements associated therewith are able to scan simultaneously only a fraction of an elementary line of the original O.

In order to scan a single elementary line (or more lines simultaneously) it is thus necessary to impart an alternating scanning movement to the carriage 56 along the guides 54 and 55.

A further difference is that in the embodiment of FIGS. 1 and 2, the original O is located on a transparent plate 5 which is fixed relative to the housing 2 while in the embodiment of FIG. 7, the carriage 53, which is also provided underneath with a transparent surface (thus making possible the scanning of the original O by the photosensor devices mounted on the carriage 56), is movable longitudinally relative to the housing 2.

In the embodiment of FIG. 6, the scanning of the original O is thus achieved as a result of the superposition of the movement of the carriage 53 and the movement of the carriage 56 mounted on the guides 54 and 55.

Figure 8:
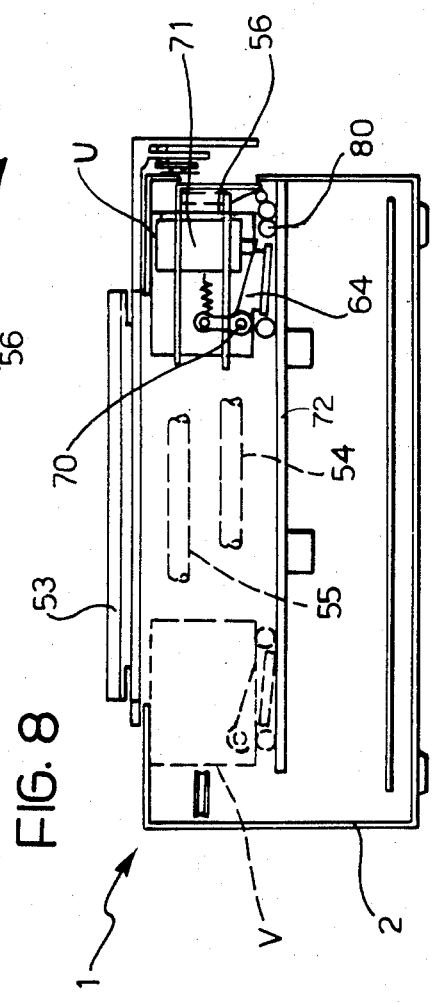
FIG. 8 is a schematic sectional view approximately corresponding to line VIII—VIII of FIG. 6.

As is best seen in FIG. 8, the movement of the carriage 56 takes place between a start of stroke position illustrated in full outline and indicated U, and an end of stroke position illustrated in broken outline and indicated V.

Reference 64 indicates a thermal printing head supported on a carriage entrained by the carriage 56 in its back and forth movement along the guides 54 and 55.

A feed device generally indicated 65 is arranged to take up sheets P from the cassette C and transfer these sheets longitudinally of the housing 2 towards the collecting cassette G which, as indicated above, is located on the opposite side of the housing 2.

Reference 66 indicates a container (cassette or cartridge) within which are two spools 67, 68 acting respectively as the feed spool and take-up spool for a print ribbon 69 the composition and operation of which is substantially identical to the ribbon 29 of the container 32.

As is seen in FIG. 6, the loaded position of the container 66 within the housing 2 is such that the axes of the spools 67 and 68 lie in a plane perpendicular to the plane of sliding of the carriage 53 carrying the original.

Figure 10:
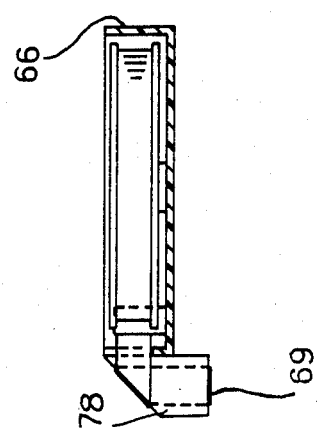
FIG. 10 is a section taken on line X—X of FIG. 9.
Figure 9:
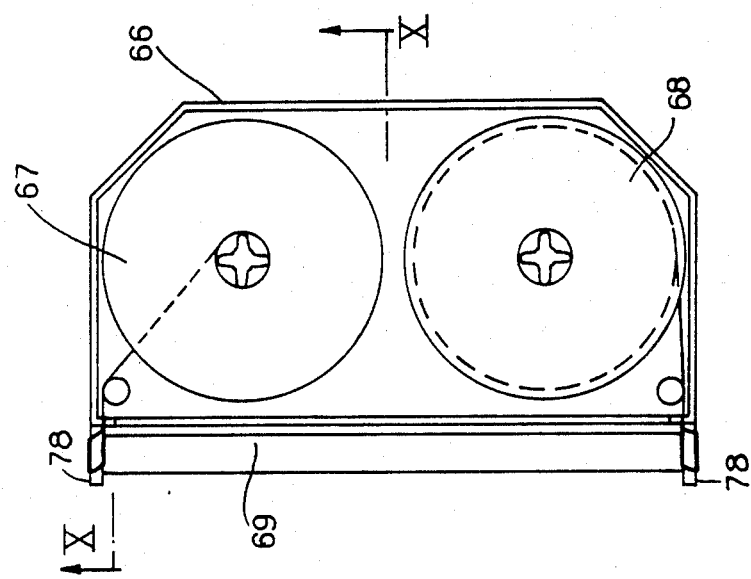
FIG. 9 is a median sectional view of one of the elements seen in FIGS. 6 and 7.

The container 66 (FIGS. 9 and 10) is provided with a pair of end projections 78 extending downwards and so shaped as to guide a portion of the ribbon 69 (active portion), of a length substantially corresponding to the working stroke of the carriage 56, transversely in a plane parallel to the plane in which the original O is located on the carriage 53.

In the loaded position, this active portion of the ribbon is located between the printing head 64 supported by the carriage 56 and the plane of sliding of the sheets P in the feed device 65.

The head 64 which is mounted on the carriage 56 by means of a pivotal bracket 70 operated by a relay 71, is thus able to press the active portion of the ribbon 69 against the sheet P supplied by the feed device 65.

The pressure exerted by the head 64 is opposed by a resiliently yieldable support 72 which extends over the entire region in which the head operates.

In the example illustrated, the feed device 65 includes a sheet take-up roller 73, three drive rollers 74, two of which extend along the sides of the support element 72, and a pair of expulsion rollers 75.

The rollers 74 lie beneath corresponding counter rollers 76 and are rotated via a gear wheel and worm screw coupling from a drive pulley 77 which is, in turn, connected, for example through a belt transmission, to the drive mechanism of the carriage 53 on which the original O is mounted.

In this manner it is ensured that each of the sheets P taken from the cassette C is advanced beneath the active portion of the ribbon 69 on which the printing head 64 acts, at a speed of advance corresponding to the speed of movement of the carriage 53.

As has been seen above, the trichromatic reproduction of the original O on the sheets P requires three successive scanning operations, for detecting the three primary chromatic components of the original and three successive printing operations for reproducing the chromatic components on the sheet P. The number of scanning and printing operations rises to four whenever it is desired to enrich the trichromatic reproduction with a black and white print.

In the embodiments of FIGS. 1 and 2, the operations of scanning and printing one chromatic component are carried out over the entire surface of the original O and over the entire surface of the sheet P before passing on to the operations of scanning and printing a different chromatic component. This makes it necessary to recirculate a single sheet P previously output.

In the embodiment of FIG. 6, the reproduction of the original is carried out by scanning three (four, in the case of enrichment with black and white) times across each line of the original and effecting simultaneously with each scanning of the original O, the printing of the appropriate chromatic component for the corresponding line on the sheet P.

In this manner, the trichromatic reproduction of each of the lines of the original O is completed before the trichromatic reproduction of the next line.

The embodiment of FIG. 6 thus avoids the necessity for the exact repositioning of the sheet P between two successive operations of scanning and printing two different chromatic components.

Accuracy of reproduction is ensured by making the movement of the rollers 74 driving the advance of the sheet P subservient to the drive mechanism of the carriage 53 on which the original is located.

In this case it is sufficient to ensure precise initial positioning of the sheet P. This may be achieved by associating the device for driving the rollers 74 with a photodetector which, in a similar manner to the photodetector 39 of FIG. 3, is arranged to detect the position reached by one of the margins of the sheet P.

The scanning movement of the original by the objective 58 and the scanning movement of the sheet P by the head 64 are thus strictly synchronised since both the objective 58 and the printing head 64 are supported by the carriage 56. The movement of the carriage 56 is effected by means of a belt transmission 79 (FIG. 7) driven by a motor, for example a d.c. or stepping motor, that has a different rotational speed in its two senses of rotation whereby to permit rapid return of the carriage 56 from its end of stroke position V to its starting position U at the end of each scanning and printing stroke.

As is best seen in FIG. 8, the printing head 64 draws with it a roller 80 for detaching the ribbon 69 from the sheet P so that the advancement of the ribbon 69 and the longitudinal advance of the sheet P are not hindered.

The thermal print ribbon 69 carries a deposit of heat meltable ink arranged in an ordered succession of consecutive frames of different colours, each frame having a length equal to the transverse extent of the sheet P.

In the ribbon 69, frames of yellow, magenta and cyan, that is, the colours used for trichromatic printing, alternate cyclically. In the case of trichromatic reproduction enriched with black and white printing, two successive groups of coloured frames of the ribbon 69 have a black ink frame between them.

Preferably the printing head 64 is raised from the ribbon 69 by operation of the relay 71 between two successive scans so as not to obstruct the sliding of the ribbon itself and change over between two differently-coloured frames.

Raising of the printing head 64 and its withdrawal from the ribbon 69 is also effected during the removal of the container 66 from the machine in order to allow the replacement of the ribbon.

From the foregoing description it can be seen that the invention allows colour copying machines to be made which are very reliable and can ensure considerable consistency of results with time without adjustment. The use of a digital printing system allows machines embodying the invention to have different functions added, such as for example, printing or remote transmission of images.

For this purpose it is possible to provide copying machines embodying the invention with a switch which deactivates the portion 3 intended for the detection of the chromatic characteristics of an original.

The reproduction portion 4 may then be connected remotely to the scanning portion 3 of a similar machine at a remote location so as to act as a telecopier.

It is also possible to connect the reproduction portion 4 to any other source of numerical data relating to an image, such as an electronic processor, or to a disc or tape on which is stored, after a possible intermediate processing operation, data collected by a photosensor during scanning of the image to be reproduced.

In this case, the apparatus of the invention is thus operated as a colour printer.

We claim:

1. An apparatus for reproducing a colour image comprising a plurality of chromatic components by printing coloured dots corresponding to said chromatic components on a sheet, comprising a stationary dot printing device capable of printing in parallel a line of dots corresponding to each said chromatic component, and a sheet feeding device for moving said sheet in respect to said printing device during a predetermined number of repeated scanning operations, wherein said feeding device includes:
    a printing roller cooperating with said printing device for sandwiching said sheet therebetween and rotatable for moving said sheet with respect to said printing device during the scanning operations,
    a plurality of rotatable advancing rollers each one having its axis parallel to the axis of said printing roller and located in a common plane on the opposite side of said printing roller with respect to said printing device,
    a plurality of pairs of pressure rollers associated with said plurality of advancing rollers, the pressure rollers of each pair engaging an associated advancing roller at a pair of locations diametrically opposed to each other and symmetric with respect to said common plane, whereby said sheet is advanced in sequence in two opposite directions in correspondence with the two locations of said pair of pressure rollers, one direction toward said printing device, and the other direction away from said printing device, and control means located in correspondence with the advancing roller farthest from said printing device for causing said sheet to be cyclically moved said predetermined number of scanning operations along a closed loop path defined by said pressure rollers, said printing device and said control means.

2. Apparatus according to claim 1, further comprising:
    a structural housing having locating means for locating said image in a predetermined position,
    polychromatic photosensor means arranged to scan areas of said colour image one area at a time in order to produce, for each scanned area, signals indicative of the chromatic components of the image to control said printing device, and drive means arranged to act on the photosensor means such as to produce, during said repeated scanning operations, relative movement between the photosensor means and the image, this latter relative movement being effected simultaneously and in coordination with the movement of said sheet, whereby the photosensor means and the printing device act simultaneously on corresponding regions of the image and of the sheet.

3. Apparatus according to claim 2, wherein:
    (a) said locating means is arranged to keep said image in a fixed position relative to said housing,
    (b) the photosensor means are mounted on a motor-driven carriage movable on guides mounted on the housing in a position facing the image, and
    (c) the sheet feeding device is arranged to impart to the sheet an advancing movement, relative to the printing device, that is synchronised with the movement of the carriage carrying the photosensor means relative to the image.

4. Apparatus according to claim 3, wherein said photosensor means includes an optical reflecting device which is movable on guides mounted on the housing at a speed equal to half the speed of movement of said motor-driven carriage.

5. Apparatus according to claim 2, wherein said photosensor means includes:
    a light source arranged to project light onto the image over the whole spectrum of visible radiation,
    a bank of chromatic filters which can be placed in the path of light reflected by the image and which have chromatic characteristics corresponding to the primary colours of a colour triangle, and
    photodetector means sensitive to the intensity of that fraction of the reflected light allowed to pass through said filters.

6. Apparatus according to claim 5, further including displacement means operative during each of said scanning operations to place a sequentially selected one of said filters in the path of the reflected light.

7. Apparatus according to claim 2, wherein said photosensor means includes:
    a plurality of light sources for illuminating said image each of which has a narrow emission spectrum corresponding to one of the primary colours of a colour triangle, and
    photodetector means sensitive to the intensity of that fraction of light emitted by the light sources and reflected by the image.

8. Apparatus according to claim 7, wherein the narrow spectrum light sources are selectively energizable so that only one of the sources illuminates the image during each of said scanning operations.

9. Apparatus according to claim 5 or claim 7, wherein the photodetector means is a semiconductor photodetector device.

10. Apparatus according to claim 9, wherein the photodetector means is a charge-coupled photodetector device (CCD).

11. Apparatus according to claim 2, wherein said printing device is operable to transfer patterns of coloured dots onto the sheet and the number of coloured dots present in each pattern transferred to the sheet is dependent on the level of the signal indicative of the corresponding chromatic component.

12. Apparatus according to claim 2, including means for selectively inhibiting the operation of said photosensor means to enable the printing device to be controlled from an external source of signals indicative of chromatic components of as colour image to be reproduced.

13. Apparatus according to claim 1, including at least one drive roller and an associated counter-roller having axes perpendicular to the axes of said advancing rollers and a stationary side guide for said sheet, said counter-roller engaging said drive roller with the sheet therebetween when the sheet is on the same side of the advancing rollers as the pressure rollers of said plurality of pairs of pressure rollers which cause the sheet to advance toward the printing device, said drive roller and said counter-roller being selectively rendered effective for causing said sheet to be laterally aligned against said side guide before said printing device is operated to ensure that the sheet is identically laterally aligned with respect to the printing device at the beginning of each scanning operation.

14. Apparatus according to claim 13, including sensing means for detecting said sheet, said sensing means being operable to selectively activate said advancing rollers and said drive roller, said sensing means including a sensor for detecting the position of the leading edge of said sheet before the initiation of relative movement with respect to said printing device caused by said advancing rollers, whereby the sheet is identically positioned with respect to the printing device at the beginning of each scanning operation.

15. Apparatus according to claim 14, including a continuously operating electric motor, motion transmitting means for simultaneously rotating said advancing rollers and said drive roller, first moving means operable for moving the pressure rollers of said plurality of pairs of pressure rollers which cause said sheet to advance toward said printing device in and out of engagement with said advancing rollers, second moving means operable for moving said counter-roller in and out of engagement with said drive roller with the sheet therebetween, and means controlled by said sensing means for alternatively operating said first and second moving means.

16. Apparatus according to claim 1, wherein said control means includes guide means adapted to assume a first position to cause said sheet to be recirculated by said advancing rollers and a second position to cause said sheet to be ejected from said sheet feeding device.

17. Apparatus according to claim 1, including a change-over control for causing said printing device to print selectively a polychromatic image in said predetermined number of scanning operations and a black and white image in a single scanning operation, said change-over control being operable to disable said control means when a black and white image is printed.

18. Apparatus according to claim 17, wherein said printing device includes a line of thermal dot printing elements and an ink ribbon comprising thermotransferrable coloured materials located between said printing elements and said sheet, and said ribbon carrying a print frame for printing in black and white, and an ordered distribution of print frames having coloured materials corresponding to said chromatic components.

* * * * *